Jan. 30, 1951     A. DOKOUPIL     2,539,573
MANUFACTURE OF FELT BLANKS
Filed Dec. 30, 1946     3 Sheets—Sheet 1
FIG: 1.
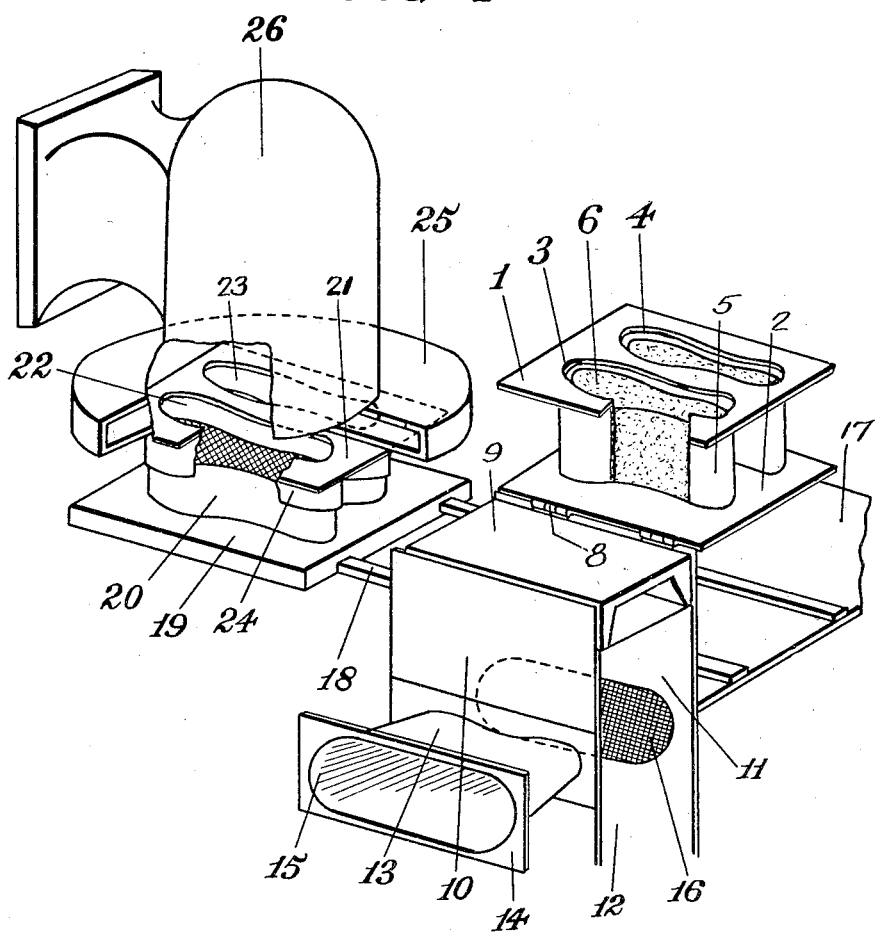
FIG: 2.
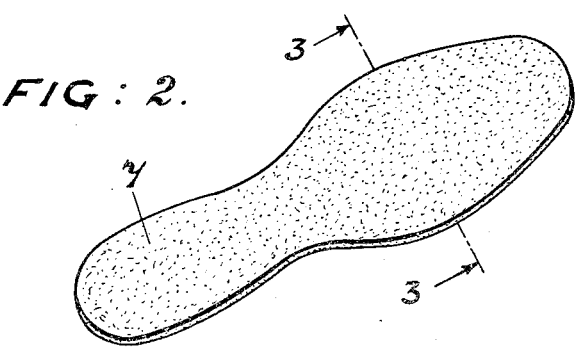
Inventor
Alois Dokoupil
By John E. Eastlack
attorney Jan. 30, 1951    A. DOKOUPIL    2,539,573
MANUFACTURE OF FELT BLANKS
Filed Dec. 30, 1946    3 Sheets-Sheet 2

Inventor
ALOIS DOKOUPIL
By John E. Eastlack
ATTORNEY

Jan. 30, 1951  A. DOKOUPIL  2,539,573
MANUFACTURE OF FELT BLANKS
Filed Dec. 30, 1946  3 Sheets-Sheet 3
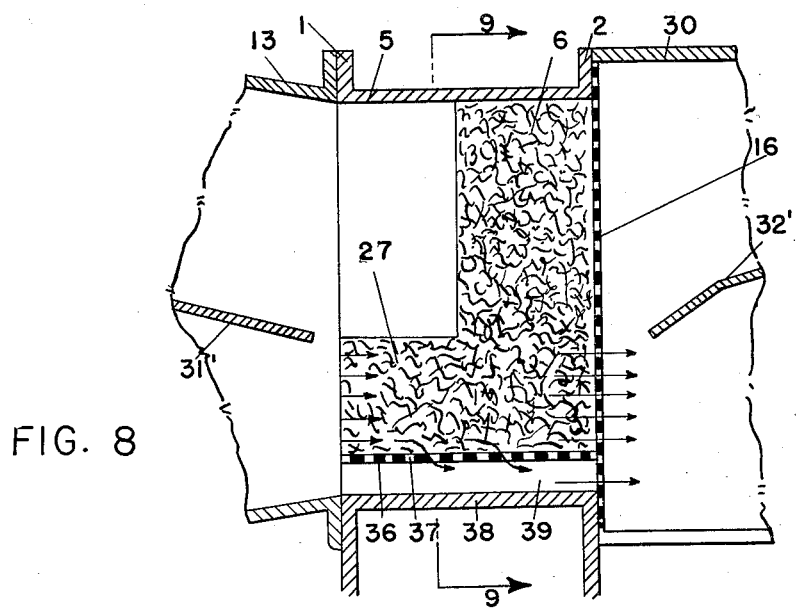
FIG. 8
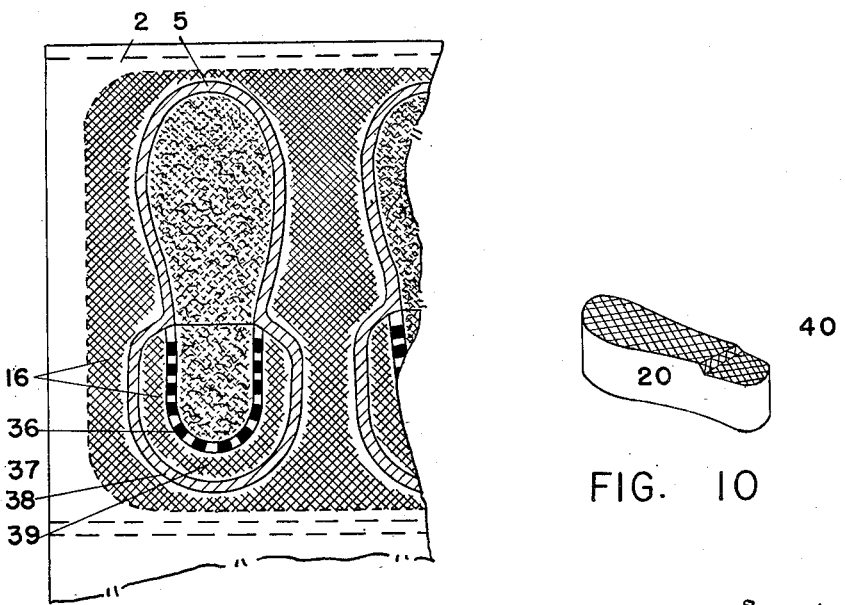
FIG. 9
FIG. 10
Inventor
ALOIS DOKOUPIL
By John E Easelack
ATTORNEY Patented Jan. 30, 1951

2,539,573

UNITED STATES PATENT OFFICE 2,539,573

MANUFACTURE OF FELT BLANKS

Alois Dokoupil, Zlin, Czechoslovakia, assignor to Bata, narodni podnik, Zlin, Czechoslovakia Application December 30, 1946, Serial No. 719,301
In Germany June 5, 1943

Section 1, Public Law 690, August 8, 1946
Patent expires June 5, 1963

8 Claims. (Cl. 28—5)

The invention relates to a process and apparatus for the manufacture of felt blanks, especially intermediate soles for house shoes made from a mixture of animal hairs, vegetable fibres or artificial fibres.

A known procedure for example consisted in stamping intermediate soles out of impregnated sheets of felt on special machines, in which the cutting surface of the stamping knife corresponded to the shape of the intermediate sole. This operation had the disadvantage that the fibres on the rim of the intermediate sole thus formed, were cut through by the pressure of the stamping knife and the short hairs or fibres fell out so that the rim of the stamped-out intermediate sole left much to be desired so far as firmness was concerned. This disadvantage was still further increased by the fact that the surface cut by stamping was not impregnated along the periphery of the intermediate sole and therefore was not stiffened and remained non-watertight. This aided absorption of dampness and decreased the resistance against mechanical influences and variations of temperatures in such a way that the original shape of the intermediate sole could not be maintained but was liable to stretch. Through this circumstance the value and the appearance of the entire house shoe was considerably diminished. A further disadvantage consisted in the fact that even the most skilful utilisation of the material in cutting out and stamping the single sheets of felt could not avoid waste, which could not be further used for any purpose because the earlier impregnation and pressing of the separate hairs or fibres into a hard layer did not allow of a further unravelling.

In the known procedure, the manufacture of the felt sheets from which the various blanks, more especially intermediate soles, were made by stamping was detailed and tedious and required numerous successive different working operations such as cleaning, loosening, mixing, carding, felting, fulling, centrifuging, impregnating, drying, pressing and cutting, and tearing up the waste produced.

The long series of these working operations made necessary a great number of special machines and appliances, which considerably increased the purchase price, workers required and floor-space and therefore raised the costs of production without the attainment of the desired good workmanship and finish. In the performance of the said working operations there is in addition to be taken into account the fact that the fulling processes, owing to the use of acids, are particularly injurious to health.

The chief object of the present invention is to avoid these disadvantages, and to attain a considerably simpler and cheaper but more suitable manufacture of various types of blanks composed of a mixture of animal hairs, vegetable fibres or artificial fibres, not as hitherto by stamping from sheets, but instead by forming, steaming, felting and pressing of the hair or fibre mixture in a hollow moulding component the shape of which corresponds with the blank to be made. By this process the final dimensions of the blank are assured.

Another object is to make initially what may be termed a "formation," composed of loosened hair or fibre mixture that has come out of a mixer and is built up directly in the hollow moulding component through the intake effect of a steam of air, and to pass the formation into a further hollow moulding component of counterpart shape, in which the formation while being steamed is finally felted and pressed to the desired thickness of the finished blank.

This new process can be profitably employed, for example, in the manufacture of felt intermediate soles for house shoes. One may successfully arrange that the rim fibres of the superposed layers of hair in the blank are interlaced and hooked together without troublesome fulling and are thereby well felted, a characteristic which in the use of natural animal wool is singularly difficult to attain and which gives a stiffening to the rim of the blank and so increases the durability as well as giving a uniformly felted upper surface.

By virtue of the invention, the long series of working operations formerly required is reduced by cutting out some of these operations, such as carding, fulling, cutting up and stamping, and tearing up of the waste. Moreover, an easier and less costly process of manufacturing blanks on a small scale is obtained by an almost complete utilisation of material without waste as well as a saving in the number of workers employed, working space, machine installations and expensive stamping knives.

Another object of the present invention is to thicken integrally certain parts of blanks, for example the heels of intermediate soles, by the forming procedure in one working process.

The accompanying drawing shows by way of example a particularly simple installation for carrying out the process according to the invention. In the drawing:

Fig. 1 is a diagrammatic perspective view of the felting machine, associated with a moulding component with already made formations.

Fig. 2 shows a finished blank, for example a felt intermediate sole.

Figs. 6 to 9 are diagrammatic views illustrating the thickening of the formation in the production of integral heels, Fig. 6 being an elevation of the apparatus used, Fig. 7 being a plan, Fig. 8 being a section to a larger scale of part of Fig. 7 and Fig. 9 being a section on the line 9—9 of Fig. 8.

Fig. 10 shows a modification of a mould part already shown in Fig. 1, the modification being for the formation of an integral heel according to Fig. 5.

Figure 5:
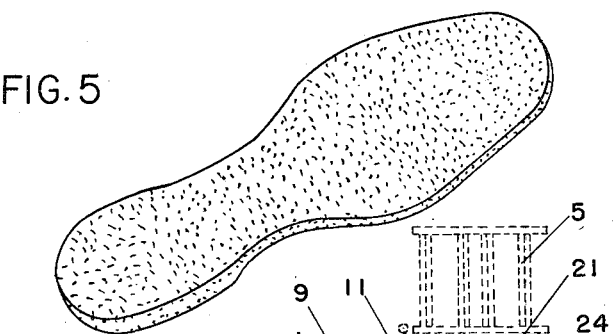
Fig. 5 shows a felt intermediate sole thickened to incorporate an integral heel, made by the forming procedure according to the present invention.
Figure 6:
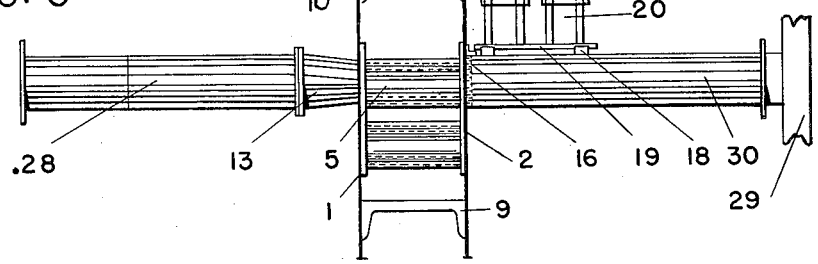
Figure 7:
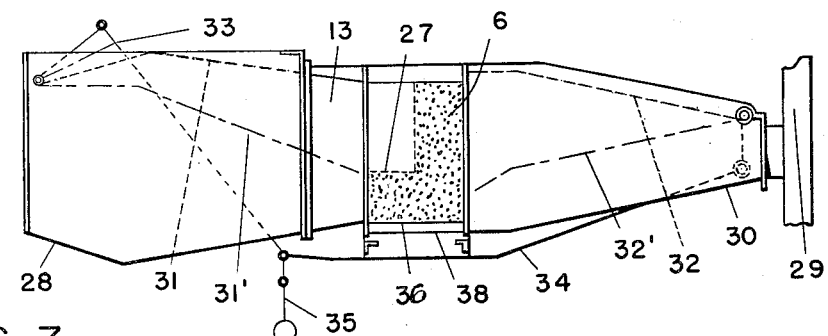

The forming appliance consists of a moulding component whose two mould opposed outer walls or plates 1, 2 are each provided, for example, with two openings 3, 4, which correspond to the shape of the intermediate soles to be made. Each of the openings 3, 4 of the one outer wall is connected with the opposed opening of the other outer wall by means of a hollow component 5 the height of which corresponds to the formation 6 to be formed and the shape of which corresponds to the intermediate sole 7 to be made.

One outer wall 2 is connected by means of hinges 8 to a slide 9 which lies between two walls 10, 11 of a vertical shaft 12. The width of the inside of the shaft corresponds to the height of the moulding component which by lowering the slide 9 is turned around the hinge 8 (through 90°) until the outer walls 1, 2 slide upon the walls 10, 11 of the shaft. The wall 10 is provided with an opening the shape of which corresponds with that of the opening 3 or 4. One end of a divergent hollow mouthpiece 13 is set in the opening of the wall 10, while the other end is formed as a larger opening 15, which is strengthened by a flange 14 connected with the mixer (not shown) by means of a pipe. In the wall 11 of the shaft 12, opposite the mouthpiece 13, there is an inset screen (wire-mesh sieve) 16 providing fine close-spaced intake openings, the screen having the shape of the opening 15 and being connected with the suction piping (not shown) of a ventilator.

Above the suction piping there is a supply-table 17 with guides 18 which lead to the immediately adjoining felting machine. On the guides 18 there is movable a plate 19 on which are positioned two hot presses 20 each with a crosswise serrated or corrugated upper surface, their shape and distance apart corresponding to the shape and distance apart of the two openings 3, 4 of the moulding component.

On the hot presses 20 a further resiliently mounted moulding component is carried, the outer wall 21 of which like the outer walls, 1, 2, is provided for example with two mould openings 22, 23 which are counterparts of the openings 3, 4. Each hollow component 24 fixed on the outer wall differs from each hollow component 5 only in its being of lesser height.

Between the outer wall 21 and plate 19 there is a power feed means (not shown), for example pressure springs, which in felting press the moulding component against the felt-hardening agitating plate 25. The agitating plate 25, a known element of the hitherto customary circularly operating felting machine, is as usual eccentrically movable, being driven by means of a motor in a housing 26. The horizontal position of the agitating plate, which is crosswise serrated or corrugated on the underside, can be adjusted in height at will.

The mode of operating the appliance, by way of example, is as follows:

The slide 9 shown at the upper end of the shaft 12 in Fig. 1 is moved downwards (by means not shown) so that the outer wall 2 and the outer wall 1 of the moulding component, connected by means of the hinge 8 with the slide 9, takes up a vertical position and is guided downwards along the shaft walls 10, 11 until one of the hollow mould components 5 lies between the opening of the mouthpiece 13 and the suction sieve 16. Thus a connection is formed between the mixer and the ventilator.

Through the suction effect of the ventilator, the amount of material required to produce for example an intermediate sole, such material being an automatically weighed mixture of say hair loosened in the mixer, passes through the mouthpiece 13 into the inside of the hollow component 5 so as to build up therein a formation 6 of loose interdependent hair, which accumulates on the suction intake sieve.

After two individual hair formations 6 are formed one after the other in the moulds 2 to 5, these moulds are swung, by turning the wall 2 through a right angle into its original position, namely the position shown in Fig. 1. There the formations 6 are transferred by hand from the hollow components 5 to the hollow components 24 of the moulds 20 to 23, temporarily under the components 5 for the purpose of felting; and the formations are compressed as they are transferred. By the pressure exerted, the original height of the hair formation is decreased to one half; therefore the hollow component 24 is shallower than the hollow component 5.

The plate 19 with the hot presses 20 and the hair formations 6 are slid as a unit under the felting machine; and the heated agitating plate 25 moving downwards presses on the resilient outer wall 21 and felts the formations 6 to the desired thickness, for example 8 mm. Thus felting is effected by the application of pressure and heat, and in this operation the formations 6 may be steamed.

After felting has taken place the plate 19 is returned to the position next to the shaft wall 11 and the felted intermediate soles are withdrawn from the hot presses 20 for the purpose of putting on a strengthening medium and drying.

Then follows compression in a further mould of similar shape, between heating plates, to the final thickness, for example 6 mm.

Figure 3:
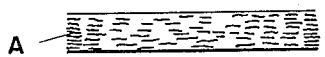
Fig. 3 is a section of a stamped out intermediate sole, as made by the hitherto customary procedure, according to the line 3—3 in Fig. 2.
Figure 4:
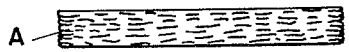
Fig. 4 is a section according to said line 3—3 of an intermediate sole made by the forming procedure according to the present invention.

As is shown in Fig. 3, the edge fibres $a$ of the individual superposed hair layers cut through by the pressure of the hitherto customary stamping knife are not bound up with one another; while in Fig. 4 it will be seen clearly how, by virtue of the present invention, the edge fibres of the individual superposed hair layers are interlaced or hooked into one another.

In Figs. 6–9 there is illustrated the application of the part-formation 27 required for the heel of an intermediate sole according to Fig. 5 to a previously accumulated sole formation 6. The intake mouthpiece 13 in this case is attached to a chamber 28 through which the stream of air carrying the hair or fibres from the mixer leads to the moulding component 5. At the accumulating sieve 16 there is attached a chamber 30 which leads to the ventilator 29. In the chambers 28 and 30 there are pivotally mounted dampers or masking members 31 and 32 which, by means of a linkage 33, 34 and a common lever 35, can be simultaneously turned in such a way that the effective intake cross-section of the lead-in mouthpiece 13 and of the intake sieve 16 are equally decreased.

In the position of the dampers designated by 31' and 32' the stream of air is led only through an end part of the moulding component 5 in which the part-formation 27 required for the heel is formed, the remaining portion of said component then being masked against entry of the fibrous material.

In order to decrease the intake resistance the wall part 36 (Figs. 8 and 9) of the moulding component 5 for the additional part-formation 27 is perforated with small intake openings 37 and round the perforated part 36 of the wall a spaced side wall 38 is provided. In the subsequent making of the part-formation 27 for the heel, the air streams through the openings 37 and through the space 39 between the wall 38 and the part wall 36, thereby enclosed, of the moulding component to the chamber 30, as clearly indicated by the arrows in Fig. 8.

The part-formation 27 can be directly taken in for the production of the formation 6, with which it is brought into connection, without the necessity of taking the moulding component out of the machine. During the production of the formation 6, in case of need, the intake holes 37 may be covered.

For the production of the heel in an intermediate sole according to Fig. 5, the hot-press moulding and felting apparatus 19 to 26 described with reference to Fig. 1 would be used, with the exception that the presses 26 would each have a pressure surface conformable to the lower surface of the sole. That is to say, as Fig. 10 shows, the pressure surface has an appropriate step 40.

I claim:

1. Apparatus for making felt blanks of a desired shape and thickness, said apparatus comprising a conduit for the conveyance of fibres in an air stream, an accumulating station in said conduit, a first moulding component which has said desired shape but is far deeper than said desired thickness, said component being movable into said station to be filled there with a supply of fibres and being removable to a transfer station, a second moulding component which also has said desired shape and is deeper than said desired thickness but shallower than said first component, means for guiding said second moulding component into register with said first moulding component at said transfer station to be filled there with a fibre formation transferred to it and pressed into it from said first moulding component and for guiding said second moulding component to a felting station, and felting means there for applying pressure and heat to said formation while it is in the second moulding component to reduce it to the desired thickness, said moulding components both serving in turn to maintain the fibre formation at said desired shape.

2. Apparatus as claimed by claim 1 in which the first moulding component is a hollow forming member defining the shape of a finished blank and open at both ends, and in which the accumulating station is provided by an open shaft adapted to receive said first moulding component, an inlet in said shaft communicating with a mouthpiece for supplying fibres, and a ventilated fine-mesh sieve in said shaft arranged opposite said inlet, said inlet and grid being shaped to register with the open ends of said first moulding component.

3. Apparatus for making felt blanks of a desired shape and thickness, said apparatus comprising a conduit for the conveyance of fibres, an accumulating station in said conduit, a first moulding component which has said desired shape but is far deeper than said desired thickness, said component being movable into said station to be filled there with a supply of fibres and being removable to a transfer station, a second moulding component which also has said desired shape and is deeper than said desired thickness but shallower than said first component, said second moulding component being movable into said transfer station to be filled there with a fibre formation transferred to it from said first moulding component and being removable to a felting station, and a felting machine there for applying pressure and heat to said formation to reduce it to the desired thickness, said machine including an agitating plate and being associated with a heated press which fits into said second moulding component and compresses said formation against said plate.

4. A process for manufacturing a felt sole, including an extra heel-thickness, which process comprises forming a supply of loose fibres as one operation into a part formation having the shape desired for the finished sole, but being uniformly much deeper than the sole thickness, adding to said part formation another supply of loose fibres as a part formation having the shape desired for the finished heel but being uniformly much deeper than the heel thickness, and compressing the total formation depthwise to the desired thicknesses of the finished sole with heel whilst maintaining the desired shapes.

5. Apparatus for making felt soles of a desired shape and thickness, including an extra heel-thickness, said apparatus comprising a conduit for the conveyance of fibres in an air stream, an accumulating station in said conduit, an inlet for fibres at said station, an accumulating sieve opposite said inlet, means adjustable to a position in which said means covers corresponding portions of said inlet and sieve and leaves uncovered portions corresponding to the shape of a heel for a sole, means for adjusting said adjustable means into and out of said position, a first moulding component which has said desired shape but is deeper than said desired thickness, said component being movable into said station to be charged there with successive supplies of fibres whilst said inlet is uncovered and partly covered respectively by said adjustable means, and being removable to a transfer station, a second moulding component which also has said desired shape and is deeper than said desired thickness but shallower than said first component, said second moulding component being movable into said transfer station to be filled there with a fibre formation including an extra formation of heel material transferred to said second moulding component and compressed into it from said first moulding component and being removable to a felting station, and means for reducing said formation to the desired thickness, including said extra heel-thickness, said moulding components both serving in turn to maintain the fibre formation at the desired shape.

6. Apparatus as claimed by claim 5, in which the covering means comprise dampers respectively associated with the inlet and accumulating sieve at the accumulating station, and the means for adjusting said covering means comprises a linkage connected to said dampers and adapted to move them equally to partially cover, or uncover, said inlet and sieve.

7. Apparatus for making an intermediate sole composed of felted fibres, said apparatus comprising an inlet mouthpiece for a loose mixture of the fibres, a sieve spaced from said mouthpiece through which sieve suction can be applied to said mouthpiece to suck the fibres therefrom towards and against the sieve, a mould movable to and from a first working position between said mouthpiece and sieve so as to receive there and to mould loosely a charge of the sucked fibres, a lower mould movable to and from registration with said first mould in a second working position thereof in which the charge of fibres is transferable as a loosely moulded formation to said lower mould, a heated press proportioned to fit into said lower mould, an agitator spaced from said press to provide therewith a felting position for said lower mould, and means for guiding said lower mould between said second working position and said felting position, in which latter position the lower mould is located between and in register with said press and agitator for compression and felting of the moulded formation.

8. Apparatus as claimed by claim 7 for making a sole incorporating a portion of greater thickness, for instance a heel, such apparatus including also a wall perforated with suction openings and forming a part of the first-mentioned mould provided to confine the portion of greater thickness, in combination with an outer wall spaced from said perforated wall to provide an additional suction passage around said portion.

ALOIS DOKOUPIL.

REFERENCES CITED

The following references are of record in the file of this patent:

UNITED STATES PATENTS

| Number | Name | Date |
|---|---|---|
| 1,056,896 | Fischman | Mar. 25, 1913 |
| 1,704,418 | Abbott | Mar. 5, 1929 |
| 2,236,472 | Freydberg et al. | Mar. 25, 1941 |

FOREIGN PATENTS

| Number | Country | Date |
|---|---|---|
| 244,331 | Switzerland | Sept. 15, 1946 |